United States Patent [19]
Eirich et al.

[11] Patent Number: 4,997,357
[45] Date of Patent: Mar. 5, 1991

[54] APPARATUS FOR TREATMENT OF POWER STATION RESIDUES

[75] Inventors: Hubert Eirich, Sandweg 16; Paul Eirich, Bahnhofstr. 11; Walter Eirich, Spessartweg 16, all of 6969 Hardheim; Herbert Durr, Viernheim, all of Fed. Rep. of Germany

[73] Assignees: Hubert Eirich; Paul Eirich; Walter Eirich, all of Fed. Rep. of Germany

[21] Appl. No.: 408,478

[22] Filed: Sep. 15, 1989

Related U.S. Application Data

[63] Continuation of Ser. No. 10,895, Feb. 4, 1987, abandoned.

[30] Foreign Application Priority Data

Feb. 14, 1986 [DE] Fed. Rep. of Germany ....... 3604760

[51] Int. Cl.⁵ .......................... B22F 3/00; C05B 19/00; C01B 1/14; C04B 11/00
[52] U.S. Cl. ................... 425/144; 23/313 R; 106/DIG. 1; 422/110; 422/209; 422/241; 423/164; 423/DIG. 20; 425/143; 425/145; 425/161; 425/222
[58] Field of Search .............. 423/16.4; 106/103, 120, 106/DIG. 1; 23/313 R; 405/128; 422/162, 209, 210, 241, 110; 425/222, 143, 144, 145, 161

[56] References Cited

U.S. PATENT DOCUMENTS

| Re. 23,825 | 5/1954 | Clark et al. ........................ 425/222 |
| 151,165 | 5/1874 | Sevin .................................. 422/209 |
| 658,727 | 9/1900 | Naef ................................... 422/209 |
| 932,789 | 8/1909 | Kritzer ............................... 422/162 |
| 1,980,130 | 11/1934 | Fasting ............................... 425/222 |
| 2,149,269 | 3/1939 | Brooks ............................... 423/641 |
| 2,560,316 | 7/1951 | Walker ............................... 422/162 |
| 2,603,832 | 7/1952 | Clark et al. ........................ 423/222 |
| 2,711,557 | 6/1955 | Russell .............................. 425/222 |
| 2,812,541 | 11/1957 | Webster et al. .................... 425/222 |
| 2,890,942 | 6/1959 | Webster et al. .................... 425/222 |
| 3,160,395 | 12/1964 | Reising ............................... 259/3 |
| 3,348,262 | 10/1967 | Heian ................................ 425/222 |
| 4,251,475 | 2/1981 | Varrasso et al. .................. 425/222 |

FOREIGN PATENT DOCUMENTS

| 150071 | 7/1985 | European Pat. Off. ............ 425/222 |
| 270649 | 8/1912 | Fed. Rep. of Germany . |
| 408852 | 4/1910 | France . |
| 789937 | 3/1959 | France . |
| 1229036 | 9/1960 | France . |
| 2539734 | 4/1984 | France . |
| 54-42398 | 4/1979 | Japan ................................. 422/162 |
| 168166 | 3/1965 | U.S.S.R. . |

Primary Examiner—Gary P. Straub
Attorney, Agent, or Firm—Paul & Paul

[57] ABSTRACT

The invention relates to a method of treating power station residues in the form of bulk material, particularly the filter ash from power stations, by hydrating the lime content by adding moisture and by further wetting of the bulk material, with an opportunity for constantly feeding in material to be processed and discharging processed material, and also to an apparatus for carrying out the method. In order to provide a method and an apparatus by which large quantities of power stations residues (ash) can be quickly and safely treated at economic and comparatively low cost, it is according to the invention proposed that the bulk material supplied should pass through a succession of different spatially substantially separate treatment zones be moved mechanically at adjustable intensity throughout the entire process, be differently treated in each treatment zone, be caused to react and transported along a reaction line under control.

34 Claims, 8 Drawing Sheets

APPARATUS FOR TREATMENT OF POWER STATION RESIDUES

This is a continuation of copending application Ser. No. 07/010,895 filed on Feb. 4, 1987 now abandoned.

The invention relates to a method of treating power station residues in the form of bulk material, particularly the filter ash from power stations, by hydrating the lime content by the addition of moisture and by further wetting of the bulk material, with a possibility of continuously feeding in material to be processed and discharging processed material.

A multiplicity of different plants and apparatuses are used for the treatment of power station ash. Most types of such apparatus were originally developed for other products and treatment methods so that in many cases their application to power station ash provides unsatisfactory results where the working methods are concerned or prove to be economically unfavourable.

Known are so-called mixing reactors which can be alternatively operated batchwise or continuously. Where the mixer reactors are concerned, the materials to be treated are handled by mixing and agitating tools in a container which rotates about an almost vertical axis. These machines deliver a product of very satisfactory homogeneity. They permit of good adjustment when charging and so guarantee a constant dwell time. The self-cleaning effect of these machines makes them unaffected by baked-on residues. Disadvantageous, however, is the fact that by reason of the technology currently available, these machines cannot be built to any desired size at an economic cost.

Furthermore—particularly for treating fly ash—horizontal drum mixers are known which have a stationary mixing container. These machines likewise have their technical and costing limits in their overall size. Furthermore, the mixing tool shaft rotating in the horizontal drum has a marked tendency towards caking. A large number of mixing tools are required to cover the entire surface of the mixing container. These tools cause considerable wear and help the material being mixed to become caked on the tool shaft and on the inside wall of the container. Furthermore, an operationally reliable sealing of the mounting of the tool shaft on the end faces of the container is problematical. Indirect measurement of the properties of the materials being mixed by infrared or microwave measuring equipment is either not possible at all or is possible only with difficulty.

From the lime sandstone industry, silo-like stationary cylindrical containers with an appropriate delivery means are known. These, too, have been tried out for use in the treatment of ash. Indeed, these reactors do make it possible to treat large reaction volumes at relatively low investment costs; however, the costs of the building and the charging station are quite considerable due to the great height of the reactors. Since these reactors have no agitating tools at all, they are very sensitive to caking. The slightest over-damping of the reactor contents leads to caking and the caked deposits can only be removed manually at considerable cost. Furthermore, these reactors do not permit any measurement of the reaction in hand, so that it is not possible to make any adjustments during the dwell time in the reactor.

So-called slaking drums are also known from the lime sandstone industry. In most cases, these are cylindrical or double-conical containers which rotate about their central axis. These containers are closed in pressure-tight fashion, water and/or steam being supplied through holes in the bearing shaft. These appliances only permit of batchwise operation, so that an expensive arrangement of machinery and technology is required for filling, emptying and disposing of the waste from the plant. Contactless measurement of the properties of the drum contents and the use of agitating tools for mixing and cleaning the container walls are likewise impossible.

Finally, a slaking drum is known which has a drum body rotating about its longitudinal axis and which has one closed end and one open end. The drum axis is inclined in respect of the vertical and the degree of filling is adjusted by the angle of inclination. Charging and emptying of the drum take place through the same open end, hence it is not possible to exclude the possibility of freshly added material being discharged again directly without undergoing reaction. It is true that attempts are being made to avoid this disadvantage by having the charging means extend as far as that end of the drum which has the closed end wall, but this measure does however markedly limit the length and thus also the volume of the drum since the charging apparatus cannot protrude as far as is desired into the drum in a freely supported fashion. Also the scrapers envisaged for the drum wall and designed to avoid caking limit the length of the drum since the forces arising when scraping off crusts and caked deposits cannot be properly absorbed structurally through freely supported arms of any desired length.

On the other hand, however, the increasing awareness of the environment and the maintenance of new and relevant regulations governing the dumping of power station residues calls for an appropriate technique for treating these materials. Power station residues are substantially filter ash, wet ash and residues from the flue gas desulphuration process.

The term treatment must be understood generally as cooling the filter ash to temperatures below 100° C., the hydration of lime (CaO) contained in the ash and damping of the ash down to a dust-free crumbly structure for optimum compressibility and handling, i.e. for transport, trans-shipment, compaction and dumping of the treated residues.

The addition of water needed for treatment is effected by adding either fresh water, process water from the power station circuit, wet ash or water-containing residues from the flue gas desulphuration process. Frequently, the water is added by applying a combination of these various sources.

Particular problems are posed by the treatment of ash with a high CaO content. The high CaO content is caused on the one hand by a definite natural occurrence of carbon which can produce ash with a CaO content of up to 70% but on the other many firing systems also use what is referred to as the dry additive process in which limestone is added to the coal and is intended to convert the sulphur present in the coal into $CaSO_4$ (gypsum) but which does at the same time also give rise to CaO.

On account of the different composition of crude coal, both the gypsum and also the CaO content of the ash will vary.

However, in order to be able to store the ash in such a way that it can be tolerated by the environment, it is absolutely necessary for the burned lime (CaO) to be slaked by the addition of water.

The mixture consisting of slaked or hydrated lime $Ca(OH)_2$ and gypsum ($CaSO_4$) has markedly hydraulic properties, i.e. it tends to solidify even under an excess of water and when air is excluded. Therefore, whereas on the one hand the addition of a certain minimum quantity of water is absolutely necessary to hydrate the burned lime, it is possible on the other, with an excess of water, to run the risk of the limegypsum mixture caking, so that processing or treatment of the power station residues is made very difficult.

The use of the aforementioned equipment and associated methods generally known from other areas of industry therefore has its limits either in terms of economy or with regard to technical feasibility. The disadvantages which arise when using the known apparatuses and methods have been set forth in detail at the outset.

Therefore, the invention is based on the problem of providing a method and an apparatus by which large quantities of power station residues (ash) can be quickly and reliably treated at economic and comparatively low costs.

This problem is resolved in that the bulk material supplied passes one after another through various spatially substantially separate treatment zones, is moved mechanically at adjustable intensity throughout the entire passage, is differently treated in each treatment zone, is caused to react and is transported under control along a reaction line.

The sub-division into different spatially separate treatment zones makes it possible to monitor the condition of the bulk material at any time and to watch the reactions which are taking place within it and the controlled onwards transport along the reaction line makes it possible to adjust the relevant dwell times in the individual treatment zones so that for instance an inadequate or excessive wetting of the material and caking on container walls or tools can be avoided.

Expediently, the method should be so devised that a mechanically propelled bed of bulk material is moved at adjustable intensity.

In contrast to known methods, therefore, the intensity of the mechanical treatment is adapted to the particular condition of the bulk material at any given time and is correspondingly varied in the individual treatment zones. In the present case, a mechanical treatment is shown to be less complicated, more favourably costed and more practical than other conceivable, for example purely chemical processes.

Where the method according to the invention is concerned, it is expedient to measure the moisture and/or temperature and/or the chemical consistency of the reaction mixture at the beginning and at the end of the reaction line and, depending on the measured values obtained, to provide for at least one measured adjustment to be carried out at any desired place along the reaction line, the adjustment taking place in sufficiently good time that it takes effect prior to the material leaving the plant.

Where the hitherto employed methods of ash treatment were concerned, no such possibilities existed. Therefore, optimum and rapid treatment of the bulk material is advantageously improved.

The preferred method is characterized in that the individual treatment zones consist essentially of a feed and mixing zone (I), a main reaction zone (II) and an agglomeration and discharge zone (III).

Sub-division into three such zones is adequate for safe treatment, i.e. particularly for complete hydration of the CaO portion without baking of the lime-gypsum mixture and is above all also compatible with the need for rapid throughput of large quantities. The individual treatment zones can, of course, merge continuously into one another at their edges. It is only essential that there should be three markedly different treatment zones identified by the said features and in which the material predominantly undergoes a treatment which is characteristic of this zone.

Ideally, in the case of the method of the invention, wet ash or water-containing residues from the flue gas desulphuration process are added to the bulk material to increase its moisture content.

These substances occur in any case during the operation of corresponding systems in a power station and can thus be sensibly utilized.

Should the addition of wet ash or residues from the flue gas desulphuration process not be adequate or not produce the desired consistency then it is advantageous if, as envisaged by the invention, process water which is either fresh or provided with additives is added in order to increase the moisture content. Fresh process water does in particular help to cool the bulk material or the hot ash while process water containing additives is to a certain extent already a waste product and can accelerate or retard specific reactions according to the additives it contains.

In this respect, it may be advantageous if, according to the invention, the process water is preheated by waste heat from the main reaction zone (II) or the precedent power station.

Preheating the water serves first and foremost to accelerate the reactions and in this way favours rapid throughput. Where the preferred method according to the invention is concerned, the physical and/or chemical properties of the reaction mixture are measured contactlessly.

Corresponding measuring probes are accordingly not or are only slightly exposed to dirt and/or damage.

Furthermore, a method is preferred in which relatively large lumps of bulk material are comminuted before being discharged.

This measure facilitates or improves further treatment, particularly the compactability of the treated material.

Where the method according to the invention is concerned, it is expediently envisaged that the feed of bulk material be controlled as a function of the moisture and/or temperature of the material at the end of the reaction line. This measure helps to optimize the method according to the invention in terms of maximizing throughput while at the same time ensuring complete treatment at the apparatus. The silo method must be so controlled that no caking occurs. The method according to the invention, on the other hand, is insensitive by reason of the constant mechanical movement and structural measures as yet to be described.

This purpose is also served by two other features expediently boasted by the method of the invention, namely that the feed of bulk material is controlled as a function of the degree to which the main reaction zone (II) is filled and the fact that the transport speed is controlled as a function of the temperature and/or moisture and/or chemical consistency at the outlet from the main reaction zone (II) or the agglomeration zone (III).

Under favourable circumstances, each of the said features can by itself resolve the underlying optimizing problem but it can, however, also be necessary to use several or all of the said features of the method in order to optimize the method.

In any case, if the parameters moisture, temperature and transport speed are properly adjusted, the method can be so carried out that the CaO content is completely slaked without any caking and so that a maximum quantity of bulk material or ash is processed.

With regard to the apparatus for treating power station residues in the form of bulk material, particularly the filter ash from power stations, by hydration of the lime content by the addition of moisture and by further wetting of the bulk material and consisting of a rotating reaction container, feed and discharge means for the bulk material and an arrangement for feed moisture, the problem on which the invention is based is resolved in that the reaction container consists of at least one cylindrical drum which is substantially open at both ends and which rotates about an axis which is slightly inclined to the horizontal and/or at least one conical frustum-shaped drum which rotates about a horizontal axis or an axis which is inclined slightly to the horizontal, and in that the ratio of the length to the greatest inside diameter of the drum is greater than 2:1 and is preferably greater than 4:1 and in that the inner wall of the drum is coated with elastic material over at least a part of the drum length.

The length of such a drum in proportion to its diameter makes it possible to arrange various treatment zones within this drum. At the same time, however, it is also possible for the drum to be preceded or followed by further apparatuses, each defining one of the treatment zones. The inclination of the axis of the drum and/or the conical, frustum-shaped embodiment of drum means that when it is rotated, transport of the bulk material contained in it is initiated, the speed of transport being possibly variable and adjustable by varying the speed of rotation of the drum and/or the angle of inclination of the drum axis. The elastic covering over the inside wall of the drum finally helps to avoid caking due to gypsum setting.

It has been found expedient to have the elastic material located at a distance from the drum.

In comparison with elastic material which is applied directly to the drum wall, elastic material provided at a distance from the drum wall offers greater freedom of movement and so facilitates the detachment of any caked-on deposits.

As already mentioned, the drum can be preceded or followed by other apparatus, in particular by further drums.

To avoid oversized components it may, for example, be expedient for the apparatus according to the invention to comprise at least two cylindrical drums of different diameter engaging one into the other.

In this case, the bulk material will always be transported out of the smaller drum into the larger diameter drum.

In addition, where the last-mentioned apparatus is concerned, it has been found advantageous to drive the two drums at different speeds.

Since the capacity and transport speed will depend inter alia also on the diameter of the drums, then in this way adaptation to the quantities of bulk material present in the drums and the corresponding transport speed is possible.

In general, an embodiment of the invention is preferred in which the elastic material which preferably consists of rubber sheets, is provided on the inside of the drum in the form of a stretched polygonal lining.

Such a stretched polygonal lining can be structurally achieved at a justifiable cost and offers the already mentioned advantages of elastic material mounted at a distance from the drum wall, since the drum wall itself has an interior circular cross-section while the stretched polygonal lining, as the name itself indicates, is polygonal in cross-section, having for example the cross-section of a regular hexagon or octagon so that the major part of it extends at a distance from the drum wall.

In order to be able correctly to carry out the necessary measurements, it is expedient in the case of the apparatus of the invention for a supporting rod to extend through the drum and substantially parallel with its axis of rotation and for measuring devices as well as water and cooling air feed lines to be provided on the supporting rod.

Since the drum is open at both its ends, there is no problem passing a supporting rod through the open ends and substantially parallel with the axis of rotation of the drum and the measuring devices as well as the feed line are thus directedly "on the spot", so that on the one hand correct measured values are obtained and on the other, for instance, water and/or cooling air can be fed exactly to the place where they are required.

A preferred embodiment is one in which at least one water and/or cooling air feed line constitutes a supporting rod.

Since a feed line is necessary in any case for water and/or cooling air, then this can logically also be of rugged construction so that it can at the same time be used as a supporting rod for the measuring devices and, for instance, for injector nozzles.

In a further embodiment of the apparatus according to the invention, it is envisaged to provide freely movable balls between the stretched elastic lining and the inside wall of the drum.

During rotation of the drum, such balls advantageously cause deformations of the stretched elastic lining so that any caked-on deposits on the inside of the lining will become detached.

Preferably, a mixing machine or a mixing tool is disposed in the intake zone of the apparatus according to the invention. Generally, the already mentioned feed and mixing zone will be defined by the range of effect of the mixing machine or mixing tools. In particular, such mixing machines or tools can achieve a variable intensity mechanical movement in the bulk material.

Similarly, it is envisaged in the preferred embodiment of the invention to provide a mixing machine or mixing tools in the discharge zone of the apparatus.

The range of these mixing machines or tools defines the aforesaid agglomeration and discharge zone.

All in all, both the mixing devices in the intake and disscharge zones of the apparatus serve to accelerate the necessarily performed reactions by intensive mixing of the constituents of the bulk material or reaction mixture.

For measuring the processed quantities of bulk material and the additives supplied such as water and the like, it is expedient for the apparatus according to the invention to have its drum or drums and/or precedent and/or subsequent mixing machines or mixing tools set up on weighing means.

For the same reason, it may be expedient to provide upstream of the intake to the apparatus and following the discharge from the apparatus means for measuring the flow of material.

For particular applications, an embodiment of the invention is preferred which is equipped with a closeable discharge orifice.

This is advantageous particularly if the onwards transport of agglomerated and treated bulk material can only be effected in batches. In this case, the treated bulk material will remain in the last stage of the apparatus until it can be discharged.

A preferred embodiment of apparatus according to the invention has its individual components disposed in the structure supporting the associated bulk material silo situated above it.

Such a construction of the apparatus according to the invention is extremely space saving and is, furthermore, favourable with regard to costs.

Further advantages, features and possible applications of the present invention may be ascertained from the ensuing description of preferred embodiments and from the associated drawings in which.

Figure 11:
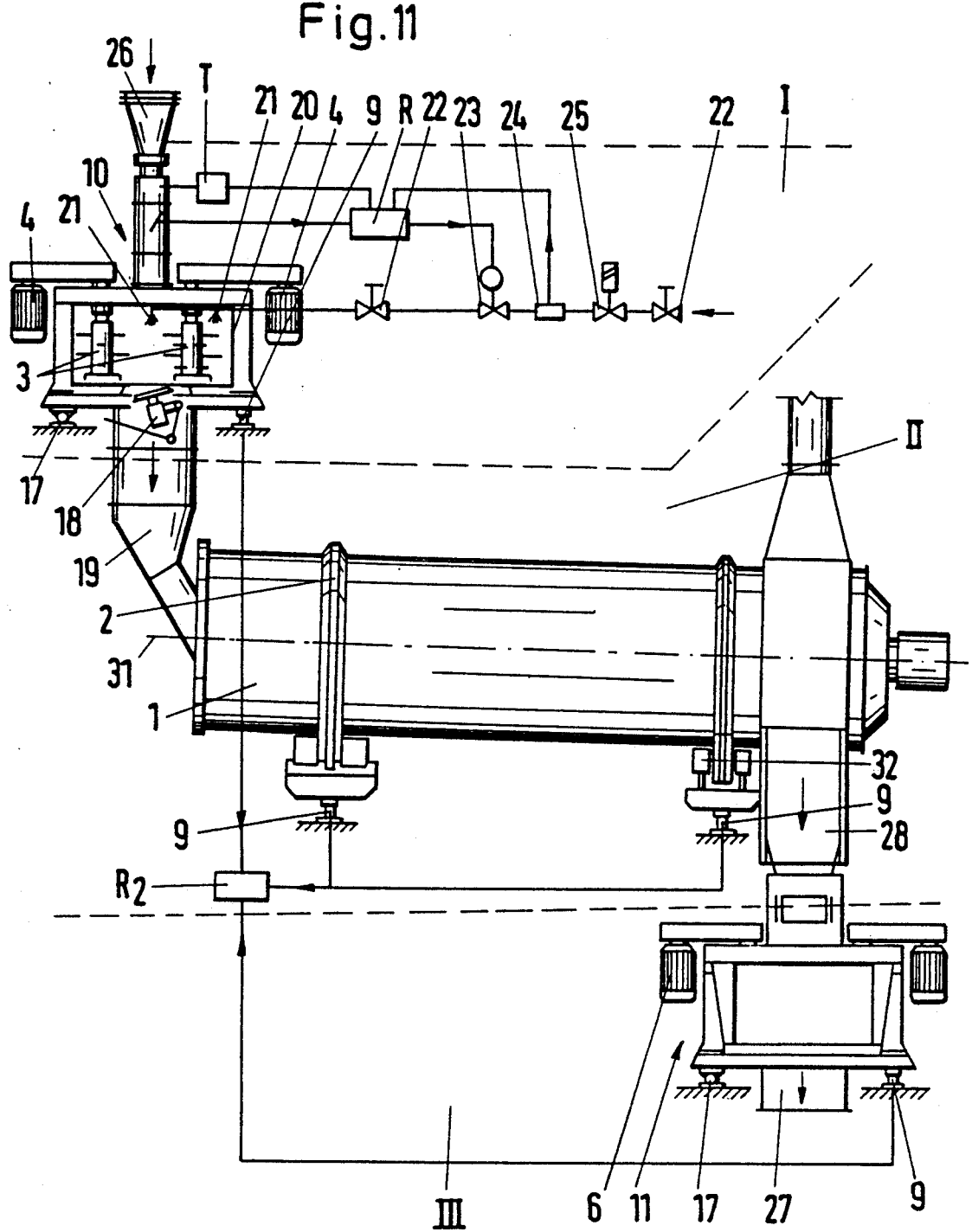
FIG. 11 is a complete apparatus for ash treatment.

It is intended firstly to describe the preferred embodiment according to FIG. 11.

Where the method is concerned, it is necessary to make a distinction between the three different stages or treatment zones I, II and III. These treatment zones are diagrammatically indicated in FIG. 11 by broken lines. In each of these three zones, the bulk material is subjected to a different mechanical treatment.

Firstly the bulk material arrives in the treatment zone I where measuring means T measure the physical (temperature, moisture content) and chemical nature of the bulk material. A computer R controls thereby the supply of water, wet ash and/or further additives which are blended intensively with the bulk material in treatment zone I and brought to a state of initial reaction.

Without intending to restrict the method or the apparatus, it is intended hereinafter to consider as bulk material the filter ash from a power station.

After premixture and prereaction, the filter ash arrives in the treatment zone II which consists essentially of the drum 1. In the main reaction zone II, mixing or kneading tools are generally not used and the mechanical treatment is accordingly less intensive. In this area, it is predominantly the slaking or hydration of the CaO content which takes place, accompanied by the development of heat, the temperature and moisture measuring instruments controlling the speed of the hydration process via a computer which regulates the supply of cooling air, cooling water, slaking water and also the speed of rotation of the drum 1 as required. In addition, a further control parameter which can be varied is the angle of inclination of the drum axis 31 which can be altered by the computer R so that the period of dwell of the filter ash in the drum 1 conforms to the duration of the reaction which is taking place. The angle of inclination of the drum axis 31 is thereby also dependent upon the rotary speed of the drum 1 and the bulk behaviour of the filter ash.

The controlled addition of cooling air, water or other additives permits of optimum control of the main reaction which, as already mentioned, consists essentially but not exclusively of the hydration of the lime content. Along with the burned lime (CaO), gypsum (CaSO$_4$) is also generally present in the filter ash. The proportion of these two components is, however, subject to marked fluctuation according to the composition of the coal. Therefore, the control of the process must take place in such a way that the entire CaO and CaSO$_4$ will be reliably hydraulized. Therefore, accurate control of the main reaction and above all its coordination with the transport speed in the drum 1 are of considerable importance to an optimized treatment method.

Finally, agglomeration and compaction of the filter ash which has been so treated takes place in treatment zone III so that finally a product results which may possibly require further processing but which can be stored in dumps. Also in the third stage of treatment, further monitoring tests take place which make it possible to make appropriate adjustment additions on the spot, i.e. in treatment zone III and also in the preceding treatment stages I and II.

FIGS. 1 to 5 show various embodiments of drums for an apparatus according to the invention.

Figure 1:
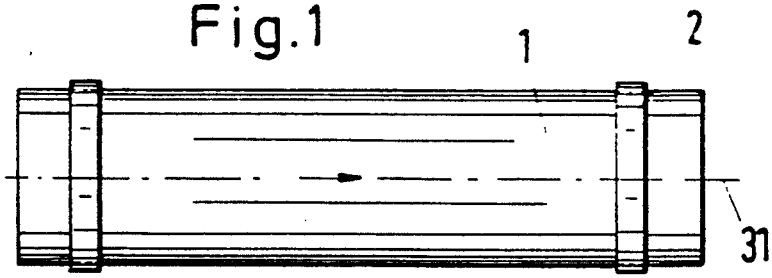
FIG. 1 shows a side view in cross-section of a drum of an apparatus according to the invention.
Figure 16:
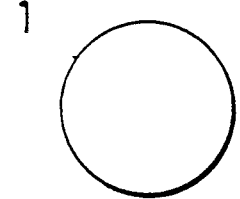
FIG. 16 is a side elevational view of the drum of FIG. 1 as viewed from the right.
Figure 2:
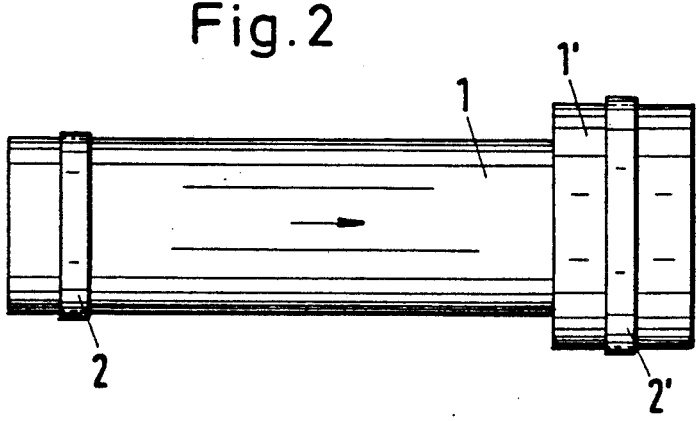
FIG. 2 shows an embodiment in which two drums of different diameter are connected serially.
Figure 17:
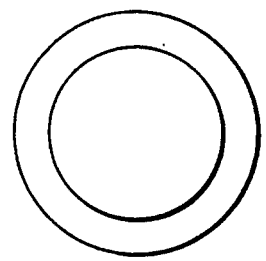
FIG. 17 is a side elevational view of the embodiment of FIG. 2 as viewed from the right.

FIG. 1 shows a simple cylindrical drum 1 with a drive wheel 2 which may be either a gear wheel or a friction wheel and by which the drum 1 is caused to rotate through a corresponding drive. The drum 1 may also have a plurality of drive wheels 2. As the partial illustration in FIG. 1 also shows, the drum has a circular cross-section which is the same throughout its length. Where the embodiment shown in FIG. 2 is concerned, two drums 1, 1' are so located to rotate about a common axis that part of one engages over part of the other. With such an embodiment, the direction of the filter ash flow is fixed and must always be from the drum 1 of smaller diameter into the drum 1' of larger diameter as otherwise the transport of ash out of the larger drum 1' into the smaller drum 1 could take place only at increased cost. In the area in which they overlap, the two drums 1, 1' are rigidly connected to each other.

Figure 3:
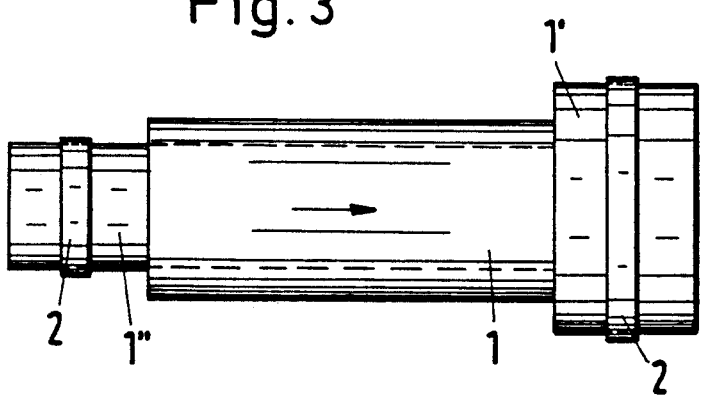
FIG. 3 is an embodiment comprising three drums of different diameters, the middle drum additionally having a stretched elastic polygonal lining.
Figure 18:
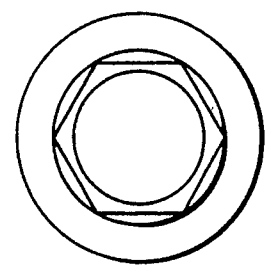
FIG. 18 is a side elevational view of the embodiment of FIG. 3 as viewed from the right.

FIG. 3 shows an embodiment similar to that in FIG. 2 but in this case three drums 1, 1', 1" are connected serially. With such an embodiment, for example, the inside of the drum 1" could form the feed and mixing zone I, the drum 1 could constitute the main reaction zone II while the drum 1' represents the agglomeration and discharge zone III. In addition, in the case of the embodiment shown in FIG. 3, the use of a stretched polygonal lining 7 inside the drum 1 is envisaged, its smallest inside diameter having, however, to be greater than the inside diameter of the drum 1". This can be clearly seen in the partial illustration in FIG. 1 which is an axial view through the drums.

Figure 4:
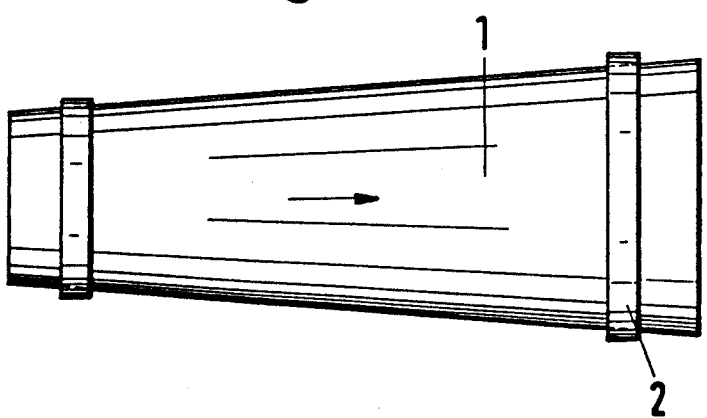
FIG. 4 shows a conical drum.
Figure 19:
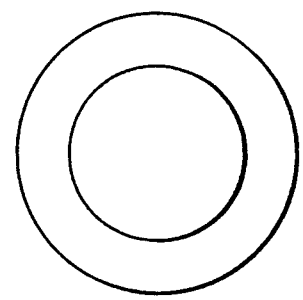
FIG. 19 is a side elevational view of the conical drum of FIG. 4 as viewed from the right.

Finally, FIG. 4 shows a drum 1 of conical shape. If such a drum rotates about a horizontal drum axis 31 and if it is charged with filter ash from its narrower aperture, then by virtue of the conical shape, rotation of the drum will always convey the ash in the direction of the wider end. In the case of cylindrical drums 1, this is achieved by a corresponding inclination of the drum axis 31.

Figure 5:
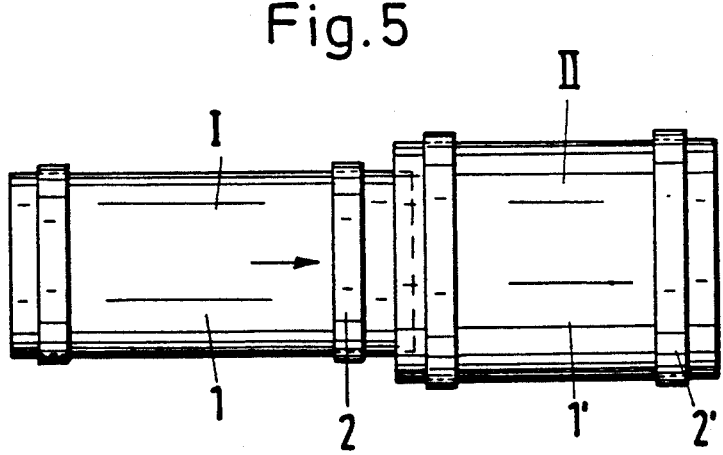
FIG. 5 shows two drums driven at different speeds.
Figure 20:
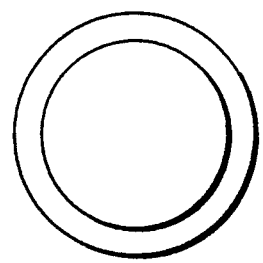
FIG. 20 is a side elevational view of the apparatus of FIG. 5 as viewed from the right.

FIG. 5 in turn shows an embodiment having two interengaging drums 1, 1' of different diameters, but in contrast to the drums shown in FIGS. 2 and 3, these two drums 1, 1' are not connected to each other in their area of overlap but are mounted to rotate freely in respect of each other. This allows the two drums to rotate at different speeds which is conducive to optimum planning of the process, since the speed of transport of filter ash in the drums 1, 1' depends not only on their speed of rotation and the angle of inclination of the axis 31 of rotation but also on their diameter. Furthermore, the two drum axes 31 may be inclined at different angles.

Figure 6:
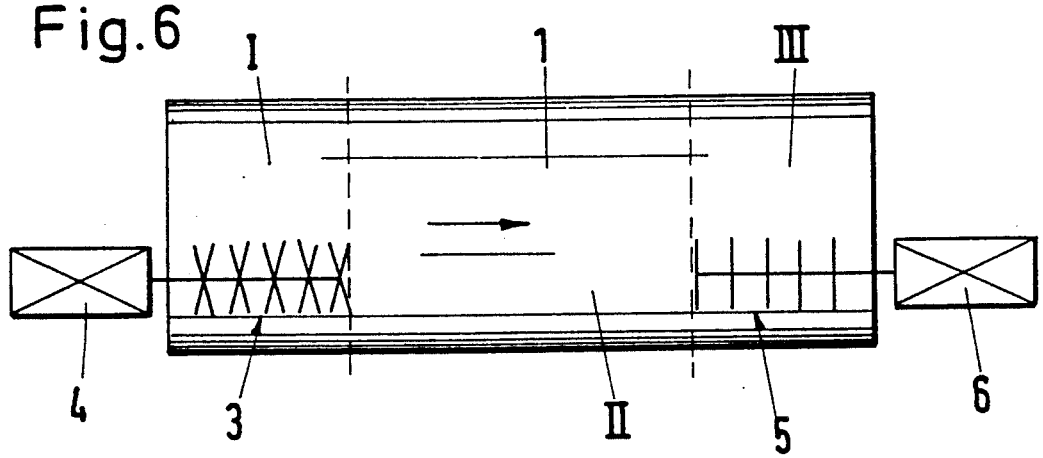
FIG. 6 shows a drum with diagrammatically indicated mixing tools projecting into it.
Figure 15:
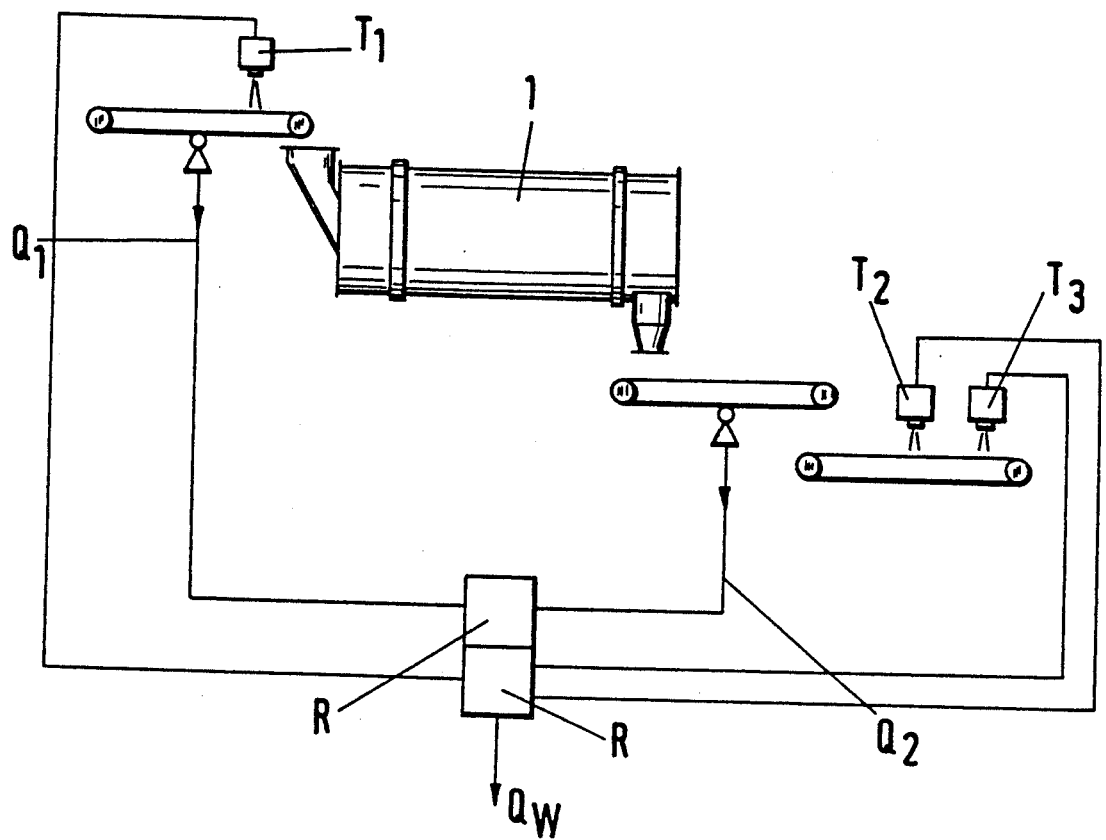
FIG. 15 is a diagrammatic view of the apparatus with measuring stations.

FIG. 6 shows a drum 1 in whose inlet zone there are mixing tools 3 and in whose discharge zone there are agglomeration tools 5. These tools are caused to rotate by corresponding drives 4 or 6 so that they assist the mixing or agglomeration processes. With this embodiment, therefore, different mechanical treatments take place in one and the same drum 1, and in analogy to the method shown diagrammatically in FIG. 15, the drum 1 can be sub-divided into three different treatment zones I, II and III which are indicated by broken lines and in which the filter ash respectively undergoes a different mechanical treatment.

Figure 7:
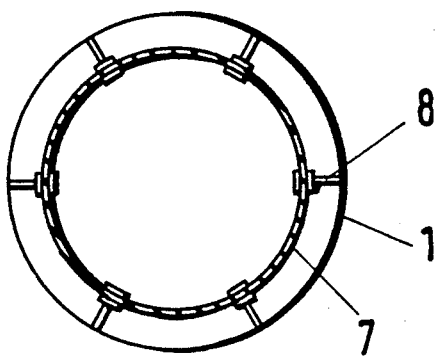
FIG. 7 shows the cross-section of a drum with an elastic stretched lining provided at a constant distance from the drum wall.
Figure 8:
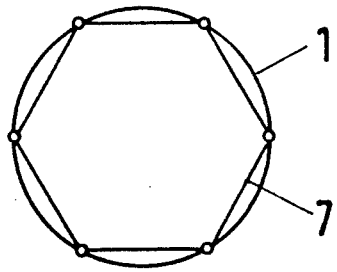
FIG. 8 shows a drum with a stretched polygonal elastic lining.

FIGS. 7 and 8 each show a drum cross-section, the inside of the drum being provided with a stretched elastic lining 7. In the example shown in FIG. 7, the stretched lining 7 is maintained by spacers 8 at a substantially fixed distance from the inside wall of the drum 1. The stretched elastic lining may, for example, consist of rubber sheets which to increase their stability of form may have, for instance, a thin steel gauze inside them so that despite their elasticity the stretched lining 7 has the circular cross-section shown in FIG. 7.

In the more diagrammatic FIG. 8, a stretched polygonal lining 7 is shown, the polygon pattern being created in that the lining material, in other words rubber for instance, is fixed to the inside wall of the drum 1 under tension. In this respect, regular polygons having six to a maximum of twelve sides have been found to be ideal.

The clear space at the back of the stretched elastic lining 7 allows the lining 7 to move in a radial direction outwards and also inwards. The inside wall of such a drum 1 is therefore capable of substantially elastic deformation. The deformation is created, for instance, by the weight of any filter ash which may be present on the undersides of the lining 7. As the drum 1 rotates, these surfaces, as soon as they get to the top, are relieved of this weight so that they again assume their original form. Any lightly caked-on material breaks away from the elastic surfaces when this happens. Thus, caked-on deposits are substantially avoided. This effect which is created by the elastic deformation of the lining 7 can be further amplified by filling the cavity between the inside wall of the drum and the lining 7 for instance with heavy balls which roll around as the drum 1 rotates and according to the position of the drum 1 so they will sometimes load and sometimes relieve the lining 7. Thus, the deformations of the elastic lining 7 will become even more marked and caked-on deposits will be more reliably avoided.

Figure 9:
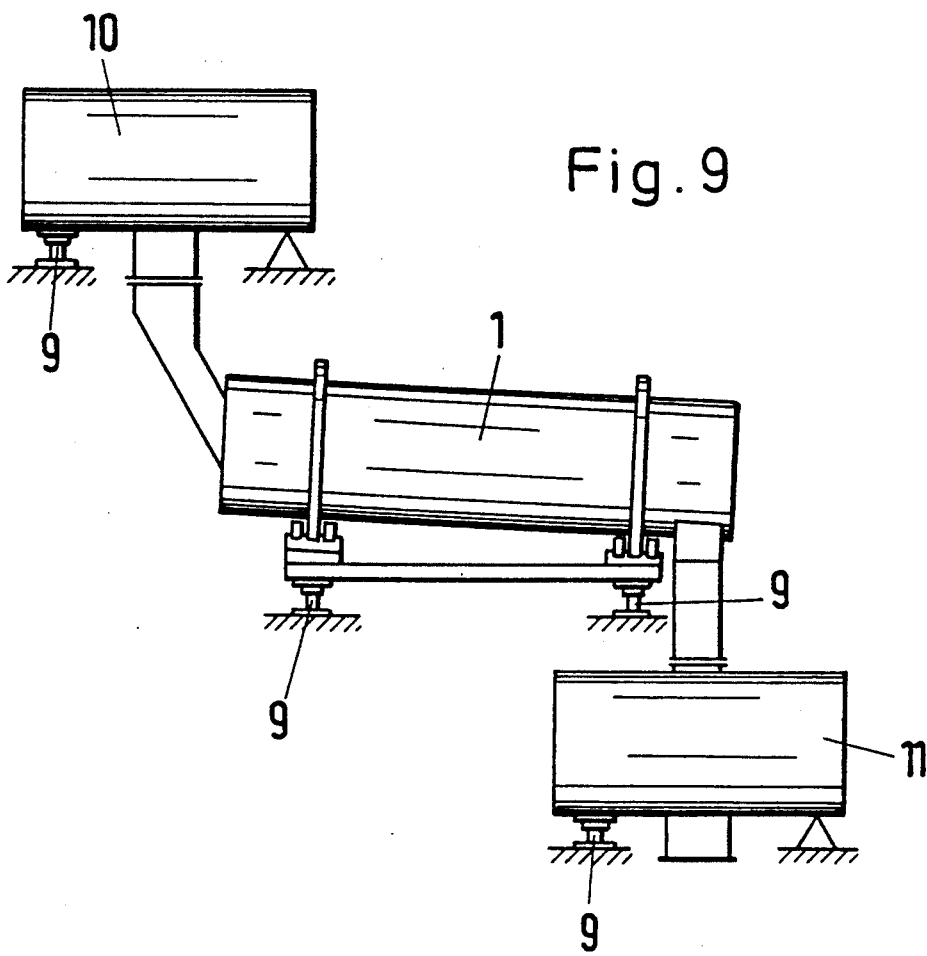
FIG. 9 shows a combination of implements mounted on force transducers.

In contrast to FIG. 6, FIG. 9 shows an embodiment of the invention in which no mixing or agglomerating tools are provided inside the drum 1, but in which the drum 1 is preceded by a premixer 10 and followed by an agglomerator 11. Subdivision of the apparatus into premixer 10, drum 1 and agglomerator 11 accordingly corresponds also to the same sequence of treatment zones I, II and III. In addition, the individual elements of the apparatus shown in FIG. 9 are mounted on force transducers 9, by means of which it is possible to determine the weight or quantity of processed material.

Figure 10:
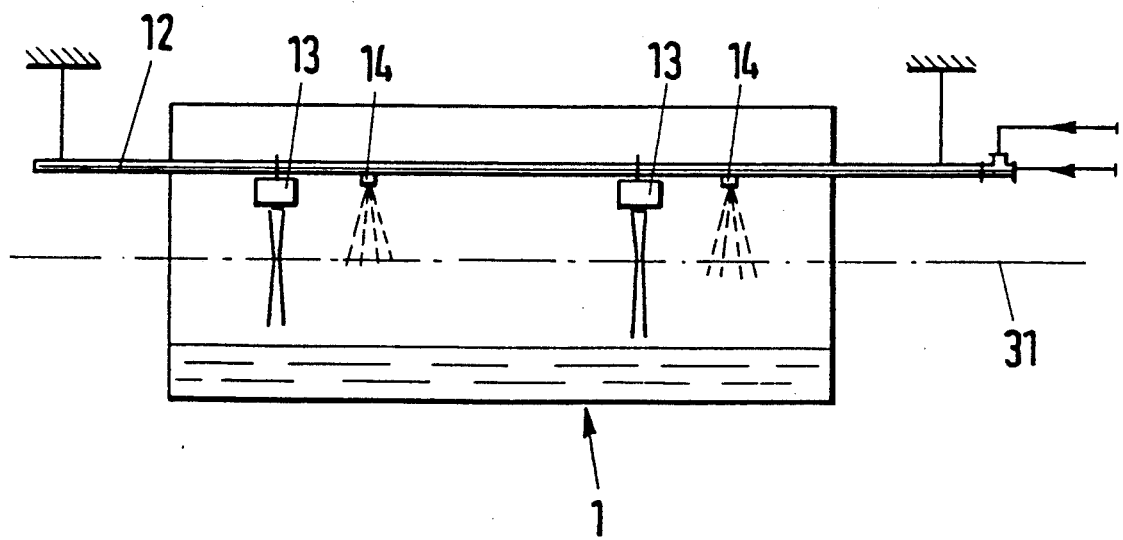
FIG. 10 is a longitudinal section through a drum with a water pipe serving as a supporting rod for measuring and feed means.

FIG. 10 shows a longitudinal section through a drum 1 in which there is disposed a water pipe 12 which additionally carries a cooling air line, not shown, the said water pipe 12 extending parallel with the axis of rotation 31 and serving as a supporting rod for measuring instrument 13 and for spray nozzles 14.

Since the end of the drum 1 is open, the water pipe 12 can be fixed, for example, on fixed frame elements outside the drum 1.

FIG. 11 shows details of an embodiment of the apparatus. The filter ash passes through the intake 26 into the premixer 10 where it is premixed with process water which emerges from the spray nozzles 21, by means of tools 3 which are rotated by a mixing tool drive 4. Previously, a measuring device T measures the temperature, moisture content and chemical consistency of the bulk material, the results of these measurements being passed to a computer R. The quantity of ash entering the mixer is determined by a bulk flow meter 29 and also the force transducer 9 at the base of the premixer 10. While the result of the measurement is being passed from the bulk flow meter 29 to the computer R, the result from the force transducer 9 arrives at the computer $R_2$ which may, however, also be coupled to or be even identical with the computer R.

The computer R controls the motorized through valve 23 and the magnetic valve 25 so that the supplied quantity of water corresponds to the need as calculated from the measured values. An inductive flow meter 24 transmits to the computer R the quantity of water actually supplied at any given moment. In addition, manually actuated valves 22 are provided in the water pipe.

The premixer 10 rests at one end on a rolling type bearing 17 while the force transducer 9 serves as a bearing at the opposite end. Since also the mixing drum 20 of the premixer 10 rotates, it is also possible by means of the force transducer 9 which is provided at only one end to determine the mass of material contained in the mixing drum 20. After the premixing stage, the ash is emptied through the closure lid 18 into the filling hopper 19 and thus passes into the drum 1. The drum 1 is mounted at both ends on force transducers 9, the measured values from which are passed to the computer $R_2$. In this way, it is no problem to determine the mass of material present in the drum. In addition, a lifting device 32 makes it possible to adjust the angle of inclination of the drum axis 31 in respect of the horizontal. The drum is driven via at least one drive wheel 2 and passes the premixed ash slowly in the direction of the drum outlet 28 while the main reaction is taking place. The drum 1 can end with its open end faces directly above the drum outlet 28 but it can also be covered at this end and have instead apertures provided on the drum wall through which the drum contents can fall into the drum outlet 28.

From there, the ash in respect of which the main reaction was concluded in the drum, passes into the agglomerator 11 which contains agglomerating tools 5, not shown, the drive 6 of which can be seen outside the agglomerator 11.

The agglomerator 11 is likewise mounted at one end on at least one rolling type bearing 17 while its other end is mounted on a force transducer 9. In a similar manner to the premixer 10, so in the case of the agglomerator 11 it is possible to determine the amount of material contained in it by means of the computer $R_2$. As a function of the quantities measured, so the computer $R_2$ controls the speed of rotation of premixer 10, drum 1 and agglomerator 11, and also the opening rhythm of the closure lid 18 and the lifting device 32 for adjusting the angle of inclination of the drum axis 31. The treated ash then leaves the agglomerator through the outlet 27.

Figure 12:
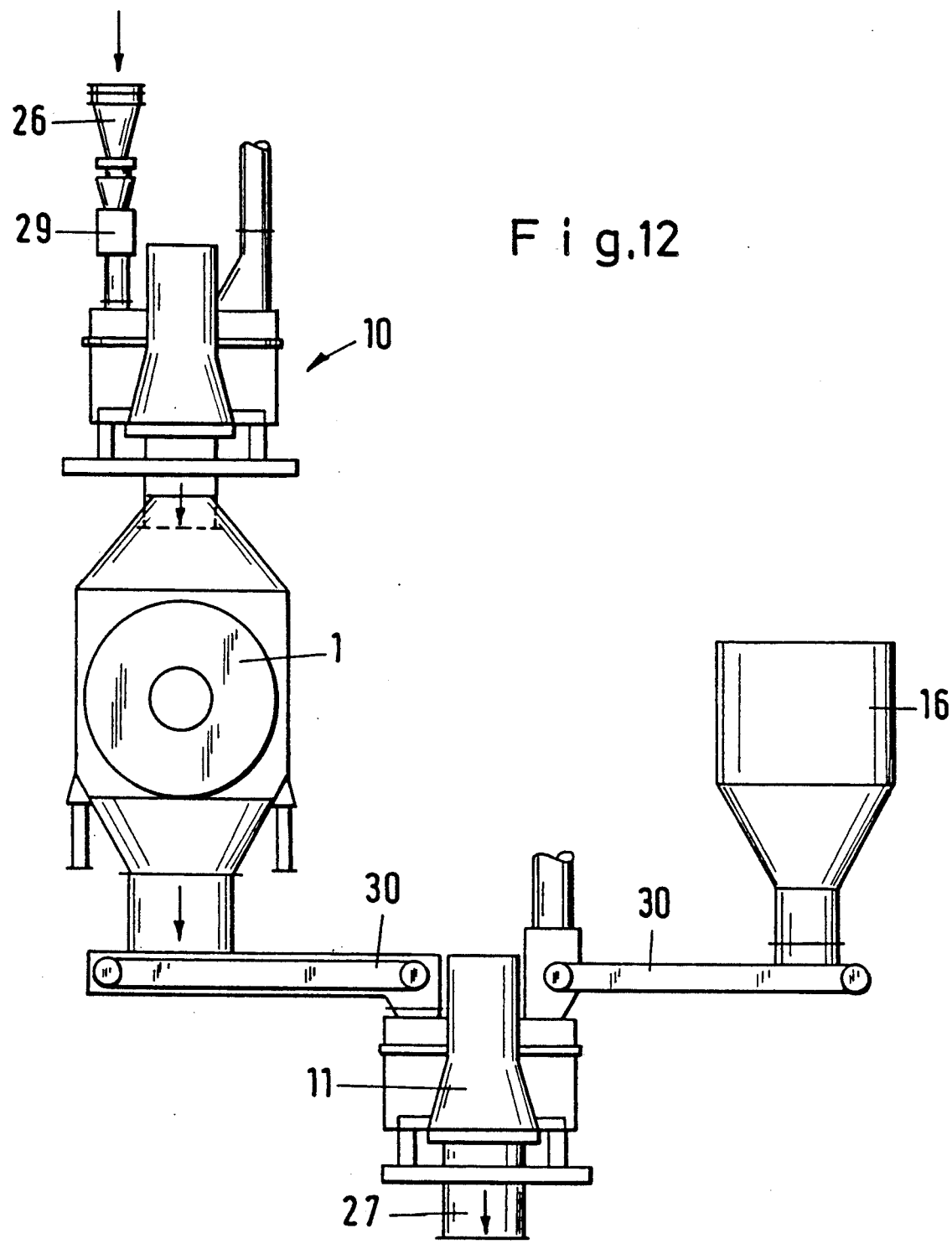
FIG. 12 is a side view of the apparatus shown in FIG. 11.

FIG. 12 shows the plant illustrated in FIG. 11 as viewed from the right in relation to the view shown in FIG. 11. It is possible to see that both the ash from the drum 1 and also wet ash from a wet ash silo 16 can be fed to the agglomerator 11 via conveyor belts 30.

Figure 13:
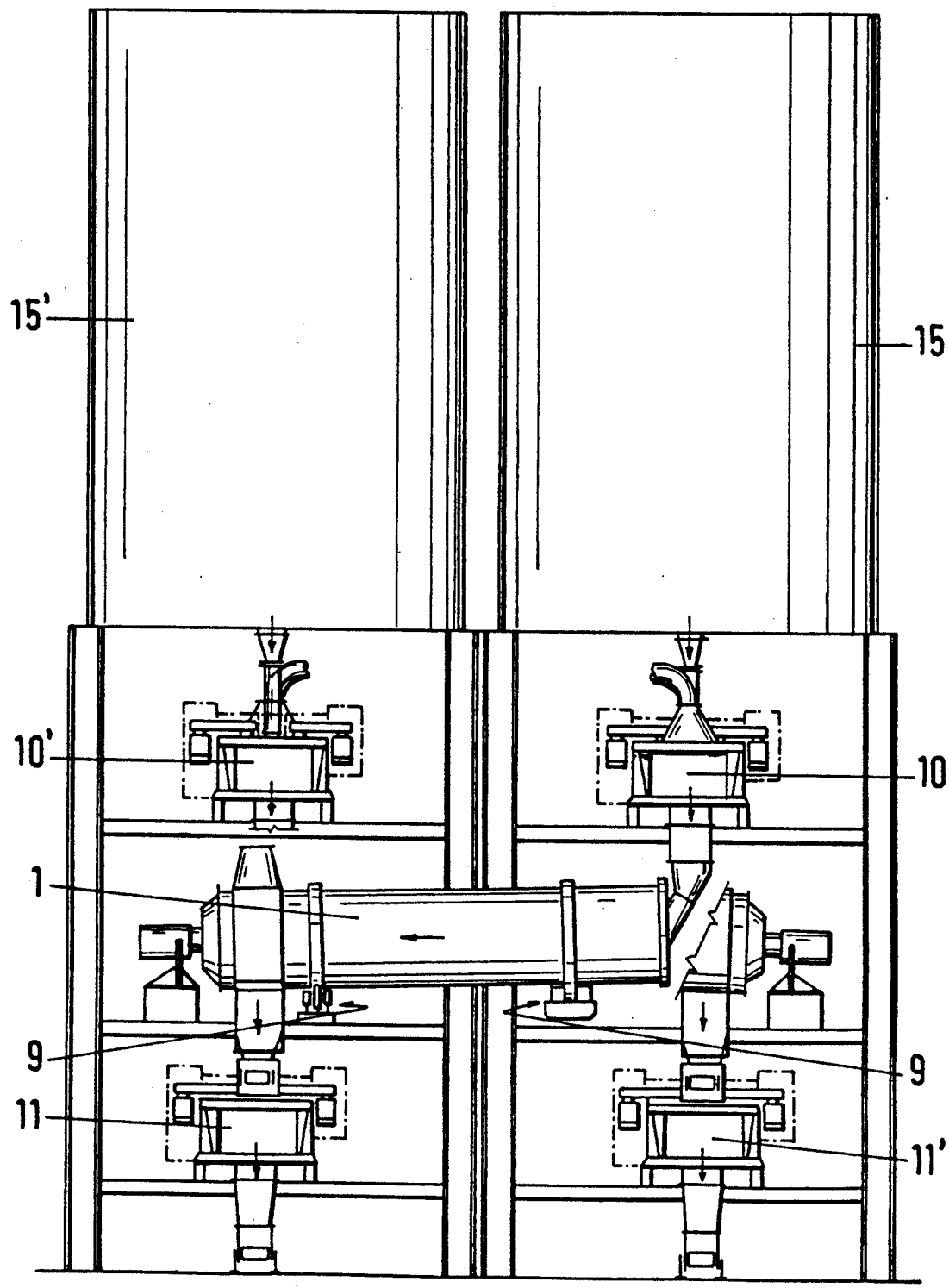
FIG. 13 shows the disposition of two apparatuses according to the invention below two bulk material silos.
Figure 14:
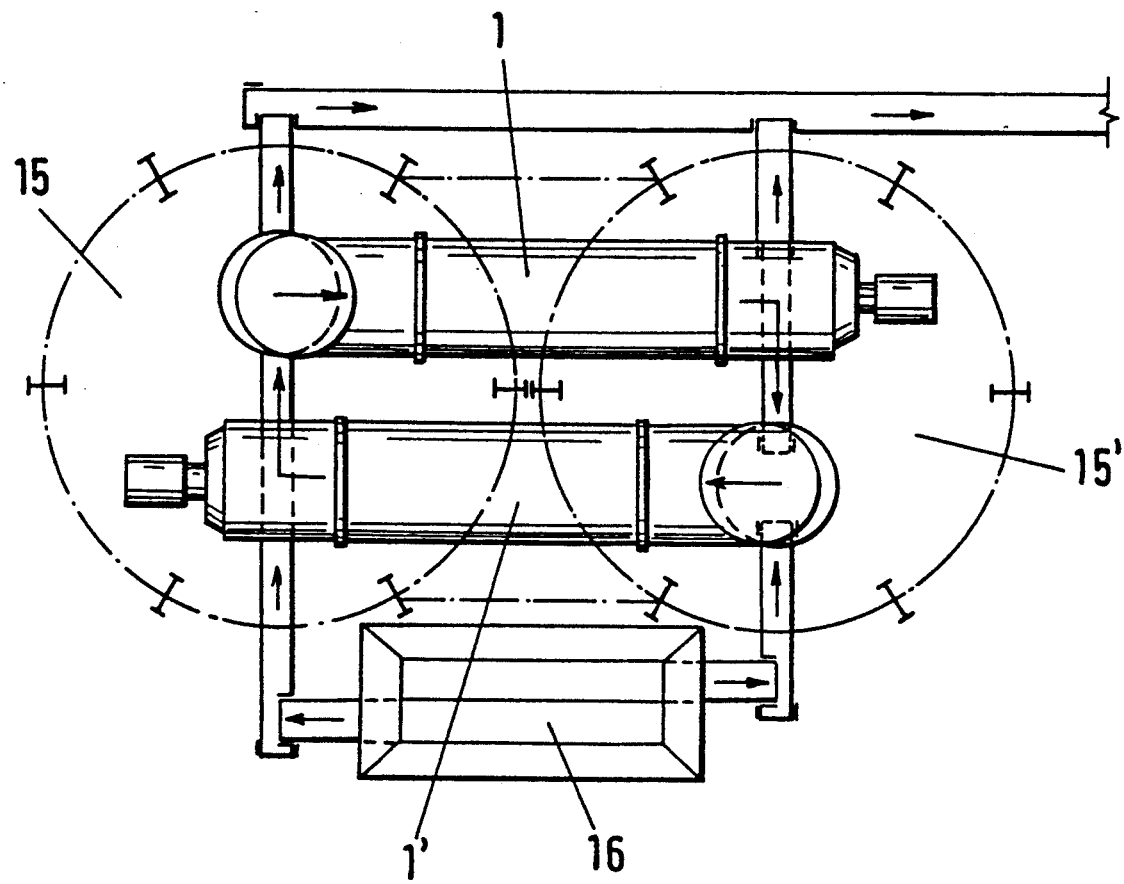
FIG. 14 is a view of FIG. 13 from above.

FIGS. 13 and 14 show the construction of two of the apparatuses just described in the structure which supports two bulk material silos 15, 15'. Similarly to FIG. 11, it is possible to see directly under the bulk material silo 15 a premixer 10, the contents of which are passed on into a drum 1, passing thence into the agglomerator 11. Behind is shown an only partially illustrated apparatus consisting of the premixer 10' which is fed from the silo 15', the drum 1' which is only partially shown and the agglomerator 11' disposed beneath it.

Such a construction within the structure which supports corresponding bulk material silos 15, 15' is extremely space saving and furthermore reduces quite substantially the costs of setting up such a plant.

FIG. 14 is a view of FIG. 13 from above, in which the space saving disposition can be clearly seen. In this case, both agglomerators 11, 11' are charged as needed from a common wet ash silo 16.

As already explained, the entire process is controlled by means of measuring devices, being regulated and optimized by one or a plurality of computers. This is shown diagrammatically in FIG. 15. In this case, $T_1$, $T_2$, $T_3$ are stations for measuring moisture, temperature and/or chemical composition, $Q_1$, $Q_2$ are measurement signals emanating from weighing means or flow meters while R denotes computers which control the process. $Q_w$ are corresponding control signals.

We claim:

1. An apparatus for treating power station residues in the form of bulk material, the residues including lime content, by hydrating the lime content and by further wetting the bulk material, the apparatus comprising:
 a premixer including an intake for bulk material and an outlet, means for providing water to the premixer, means for monitoring the flow of bulk material into the premixer, means for measuring the temperature and moisture content of the bulk material flowing into the premixer, means for monitoring the flow of water into the premixer, means for measuring the weight of the contents of the premixer, means for mixing the water and the bulk material in the premixer to form a premixture, and means for exhausting the premixed material from the premixer through the premixer outlet;
 conduit means for conveying the premixer material to a primary mixing means;
 primary mixing means including a rotatable mixing drum, the mixing drum having an intake for receiving premixer material and an outlet, the mixing drum having a rotational axis inclined with respect to the vertical to induce gravitational flow of material fed into the intake from the drum intake to the drum outlet, means for rotating the mixing drum, means for measuring the weight of the contents of the mixing drum, and means varying the angle of inclination of the rotational axis;
 means for conveying the material from the drum outlet to an agglomerator;
 an agglomerator for agglomerating material received from the primary mixing means, the agglomerator including means for measuring the weight of the contents of the agglomerator, mixing means for agglomerating the contents of agglomerator; and means for exhausting the contents from the agglomerator;
 and means for controlling the rotational speeds of the premixer mixing means, the drum, and the agglomerator mixing means, the angle of inclination, the flow of water to the premixer, and the dwell time of the water and bulk material in the premixer, as a predetermined function of the flow of bulk material to the premixer, the weight of the contents of the premixer, the weight of the contents of the drum, and the weight of material in the agglomerator.

2. An apparatus for treating power station residues in the form of bulk material, the residues including lime content, by hydrating the lime content and further wetting the bulk material, the apparatus comprising:
 a premixer including an intake for bulk material and an outlet, means for measuring the weight of the contents of the premixer, means for providing water to the premixer and means for controlling the flow of water to the premixer, means for mixing the water and the bulk material in the premixer to form a premixture, and means for exhausting the premixture from the premixer through the premixer outlet;
 means for conveying the premixture to at least one rotatable drum, the drum being substantially open at both ends and rotatable about the central axis, one open end portion of said at least one drum defining an inlet zone, the other open end portion defining an outlet zone; the ratio of the length of the at least one drum to the greater inside diameter of the at least one drum being greater than 2:1; the central axis of the at least one drum being oriented with respect to the horizontal to induce gravitational flow of the bulk material; means for varying the angle of inclination of said drum axis;

primary mixing means consisting of at least a section of said drum the inner wall of said section of the drum being lined with elastic material over the length thereof means for measuring the temperature of the bulk material within the primary mixing means;

means for the delivery of treatment fluids into the primary mixing means and means for controllably rotating the at least one rotatable drum.

3. The apparatus of claim 1 further comprising agglomerating means for agglomerating material received from the primary mixing means, and means for conveying material from the primary mixing means to the agglomerating means;

the agglomerating means including mixing means for agglomerating the contents of the agglomerating means; and means for exhausting the contents from the agglomerating means.

4. The apparatus of claim 3 wherein the agglomerating means comprises a second section of the at least one drum.

5. The apparatus of claim 3 wherein the agglomerating means is separate and spaced from the primary mixing means.

6. The apparatus of claim 4 wherein the agglomerating means is rotatable and further including means for controlling the rotational speed of the agglomerating means.

7. The apparatus of claim 5 further including means for measuring the weight of the contents of the agglomerating means.

8. The apparatus of claim 2 wherein the premixer further comprises means for monitoring the flow of bulk material into the premixer.

9. The apparatus of claim 2 wherein the premixer further includes means for measuring the temperature of the bulk material flowing into the premixer.

10. The apparatus of claim 2 wherein the premixer further includes means for measuring the moisture content of the bulk material flowing into the premixer.

11. The apparatus of claim 2 further comprising means for measuring the weight of the contents of the at least one drum.

12. The apparatus of claim 2 wherein the means for controlling the rotational speeds of the premixer and the at least one drum, the angle of inclination of the central axis of the at least one drum, the flow of water to the premixer, and the dwell time of the water and bulk material in the premixer, are each controlled as predetermined functions of the flow of bulk material to the premixer, the weight of the contents of the premixer, and the weight of the contents of the at least one drum.

13. The apparatus of claim 2 further comprising at least one elongated support member extending within the at least one drum for delivery of treatment fluids, the at least one elongated support member extending substantially parallel to the central axis.

14. An apparatus according to claim 13 further including means for delivering treatment liquid to bulk material within the at least one drum.

15. An apparatus according to claim 14 wherein the means for delivering treatment liquid comprises the elongated support member.

16. An apparatus according to claim 15 further comprising means for supplying air to cool the bulk material within the at least one drum, the air supply means being mounted on the support member.

17. An apparatus according to claim 14 further comprising means for measuring at least one property of the bulk material at at least one locus within the at least one drum, the measuring means being mounted on the support member.

18. An apparatus according to claim 2 wherein the at least one drum is cylindrical, the central axis being inclined from the horizontal to induce flow of the bulk material.

19. An apparatus according to claim 2 wherein the at least one drum has a conical frustrum shape adapted to induce flow of the bulk material.

20. An apparatus according to claim 19 wherein the central axis is horizontal.

21. An apparatus according to claim 19 wherein the central axis is inclined slightly from the horizontal.

22. An apparatus according to claim 2 wherein the ratio of the length of the at least one drum to the greatest inside diameter of the at least one drum is greater than 4:1.

23. An apparatus according to claim 2 wherein at least portions of the elastic material lining the at least one drum are spaced from the interior surface of the at least one drum.

24. An apparatus according to claim 23 wherein the elastic material comprises a polygonal surface, the elastic material being mounted inside the at least one drum under tension.

25. An apparatus according to claim 2 wherein the elastic material is rubber.

26. An apparatus according to claim 2 wherein the at least one drum comprises two cylindrical drums of different diameter, one end of the drum of smaller diameter extending within one end of the drum of greater diameter.

27. An apparatus according to claim 26 wherein the two cylindrical drums are rotatable at different angular rotational speeds.

28. An apparatus according to claim 2 further including at least one freely movable ball provided between the elastic material lining of the at least one drum and the inner wall of the at least one drum.

29. An apparatus according to claim 2 wherein the at least one drum has an inlet for the bulk material, and further comprising second mixing means provided proximate the inlet 30. An apparatus according to claim 29 wherein the at least one drum has an outlet from the bulk material, and further comprising third mixing means provided proximate the outlet.

31. An apparatus according to claim 30 further comprising means for weighing the bulk material.

32. An apparatus according to claim 30 wherein the outlet is provided with a closable orifice.

33. An apparatus according to claim 2 further comprising means for measuring the flow of the bulk material.

34. An apparatus according to claim 2 further comprising at least one storage silo for storing bulk material prior to treatment and a supporting structure for the at least one storage silo, the at least one drum being disposed in the supporting structure.

* * * * *